US009748534B2

United States Patent
Hanawa et al.

(10) Patent No.: US 9,748,534 B2
(45) Date of Patent: Aug. 29, 2017

(54) ELECTRIC TOOL AND BATTERY PACK FOR THE ELECTRIC TOOL

(71) Applicant: HITACHI KOKI CO., LTD., Tokyo (JP)

(72) Inventors: Hiroyuki Hanawa, Ibaraki (JP); Shota Takeuchi, Ibaraki (JP); Yoshihiro Nakano, Ibaraki (JP); Itsushi Ogawa, Ibaraki (JP); Kousei Yokoyama, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 338 days.

(21) Appl. No.: 14/182,931

(22) Filed: Feb. 18, 2014

(65) Prior Publication Data
US 2014/0294483 A1  Oct. 2, 2014

(30) Foreign Application Priority Data

Mar. 28, 2013  (JP) ................................. 2013-070568

(51) Int. Cl.
| | | |
|---|---|---|
| *H01M 10/052* | (2010.01) | |
| *H01M 2/10* | (2006.01) | |
| *B25F 5/00* | (2006.01) | |

(52) U.S. Cl.
CPC ............. *H01M 2/1022* (2013.01); *B25F 5/00* (2013.01); *Y10T 403/1624* (2015.01)

(58) Field of Classification Search
CPC .......................... H01M 2/1055; H01M 2/1022
See application file for complete search history.

(56) References Cited

U.S. PATENT DOCUMENTS

2008/0302552 A1* 12/2008 Kondo ................ H01M 2/1066
173/217
2010/0248016 A1* 9/2010 Hanawa .............. H01M 2/1055
429/178

(Continued)

FOREIGN PATENT DOCUMENTS

| JP | 5-48388 U | 6/1993 |
| JP | 10-296660 A | 11/1998 |

(Continued)

OTHER PUBLICATIONS

Japanese Office Action for the related Japanese Patent Application No. 2013-070568 dated Jul. 8, 2016.

(Continued)

*Primary Examiner* — Olatunji Godo
(74) *Attorney, Agent, or Firm* — Kenealy Vaidya LLP

(57) ABSTRACT

When a battery pack is mounted to a battery attachment part, the battery pack is slid in a horizontal direction (a direction substantially perpendicular to an upper-lower direction) with respect to the housing, e.g., along a long longitudinal direction of a battery-side rail part, such that tool-side rail parts of the battery attachment part are introduced into engaging recess portions of the battery pack. Thereby, the elastic members are fitted and compressed in the battery-side rail parts and the tool-side rail parts, so that the elastic members press upwards the battery-side rail part (e.g., the battery pack) and press downwards the tool-side rail parts (e.g., the housing). That is, the elastic members press the battery pack and the housing such that they come close to each other.

17 Claims, 5 Drawing Sheets

(56) References Cited

U.S. PATENT DOCUMENTS

2012/0045667 A1* 2/2012 Yoneda ............... H01M 2/1055
429/7
2014/0321034 A1* 10/2014 Takeuchi ............ H01M 2/1022
361/679.01

FOREIGN PATENT DOCUMENTS

| JP | 2001-351592 A | 12/2001 |
| JP | 2002-260619 A | 9/2002 |
| JP | 2007-118098 A | 5/2007 |
| JP | 2010-240797 A | 10/2010 |

OTHER PUBLICATIONS

Japanese Office Action for the related Japanese Patent Application No. 2013-070568 dated Sep. 16, 2016.

* cited by examiner

ELECTRIC TOOL AND BATTERY PACK FOR THE ELECTRIC TOOL

CROSS-REFERENCE TO RELATED APPLICATIONS

This application claims priority from Japanese Patent Application No. 2013-070568 filed on Mar. 28, 2013, the entire subject-matter of which is incorporated herein by reference.

TECHNICAL FIELD

The invention relates to an electric tool having a battery pack detachably mounted thereto and a battery pack that is used for the electric tool.

BACKGROUND

In a cordless electric tool, a battery pack for feeding power to a motor, which is a driving source, is detachably mounted to the tool. The battery pack has therein a secondary battery such as a chargeable lithium battery and the like. The battery pack is mounted to a lower end portion (a battery attachment part) of a housing handle part, for example, by sliding the battery pack along a rail part in a horizontal direction (see, for example, JP-A-2002-260619).

SUMMARY

A rail that guides the sliding of the battery pack is made to have a play in a margin as regards a size thereof. Thus, it is necessary to take a measure so as to mount the battery pack without rattling. It is considered that the pressing of the battery pack with an elastic member such as rubber is effective as a simple measure against the rattling of the battery pack. However, a gap may be formed between a housing and the battery pack, depending on the pressing direction, so that an outward appearance may be deteriorated and dust resistance may be lowered.

Therefore, illustrative aspects of the invention provide an electric tool and a battery pack capable of minimizing a gap between a housing and the battery pack while suppressing the battery pack, which is mounted to the housing, from rattling.

According to one illustrative aspect of the invention, there is provided an electric tool comprising: a housing having a battery attachment part; and a battery pack, wherein a rail part, which is configured to guide mounting of the battery pack to the battery attachment part, is provided with a pressing member that is configured to press the battery pack and the housing such that they come close to each other.

According to another illustrative aspect of the invention, there is provided an electric tool comprising: a housing having a battery attachment part; and a battery pack that is coupled to a lower side of the battery attachment part, wherein the battery pack is configured to come close to an upper side when the battery pack is mounted to the battery attachment part along a rail part.

According to still another illustrative aspect of the invention, there is provided an electric tool comprising: a housing having a battery attachment part, to which a battery pack is configured to be mounted thereto, wherein the battery pack is configured to come close to the housing when the battery pack is mounted to the battery attachment part along a rail part.

According to still another illustrative aspect of the invention, there is provided a battery pack configured to be mounted to an electric tool having a battery attachment part, the battery pack comprising: a battery-side rail part configured to be guided along a tool-side rail part of the battery attachment part, wherein the battery-side rail part is provided with a pressing member configured to press the battery pack and the electric tool such that they come close to each other.

Incidentally, any combination of the above constitutional elements and a method, a system and the like that are implemented by converting the invention are also effective as aspects of the invention.

According to the illustrative aspects of the invention, it is possible to provide an electric tool and a battery pack capable of minimizing a gap between a housing and the battery pack while suppressing the battery pack, which is mounted to the housing, from rattling.

BRIEF DESCRIPTION OF THE DRAWINGS

FIGS. 5A to 5C each illustrates an outward appearance of an elastic member 2 shown in FIG. 1 and the like;

DETAILED DESCRIPTION

Figure 1:
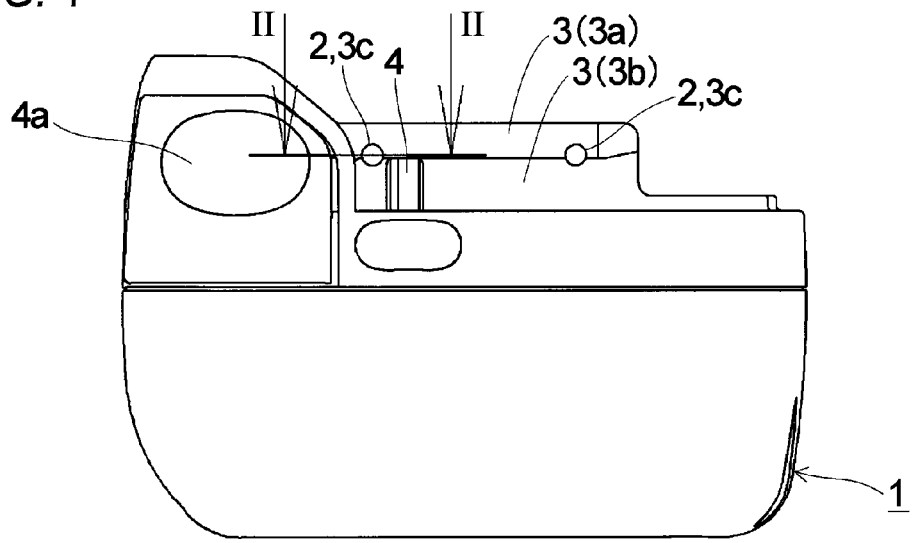
FIG. 1 is a side view of a battery pack 1 that is mounted to an electric tool in a first illustrative embodiment of the invention.

Hereinafter, preferred illustrative embodiments of the invention will be described with reference to the drawings. Incidentally, the same or equivalent constitutional elements, members and the like shown in the respective drawings are denoted with the same reference numerals and the overlapping descriptions are appropriately omitted. The illustrative embodiments do not limit the invention and are just exemplary, and all features or combinations thereof described in the illustrative embodiments do not necessarily define the essentials of the invention.

<First Illustrative Embodiment>

Figure 2:
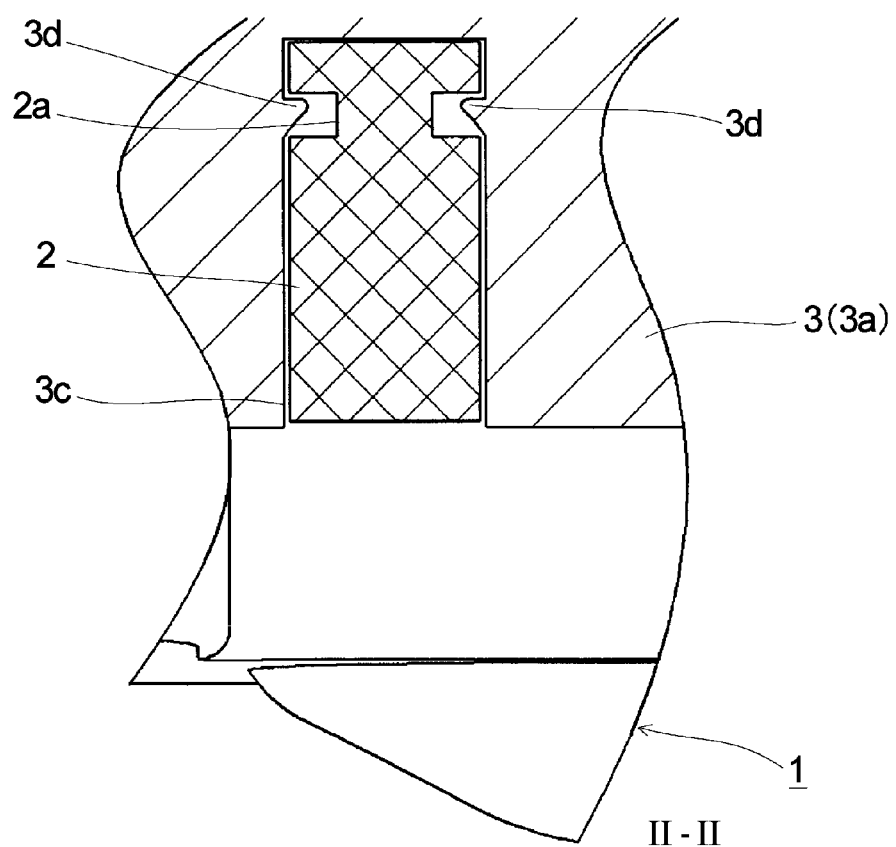
FIG. 2 is an enlarged sectional view taken along a line II-II of FIG. 1.
Figure 3:
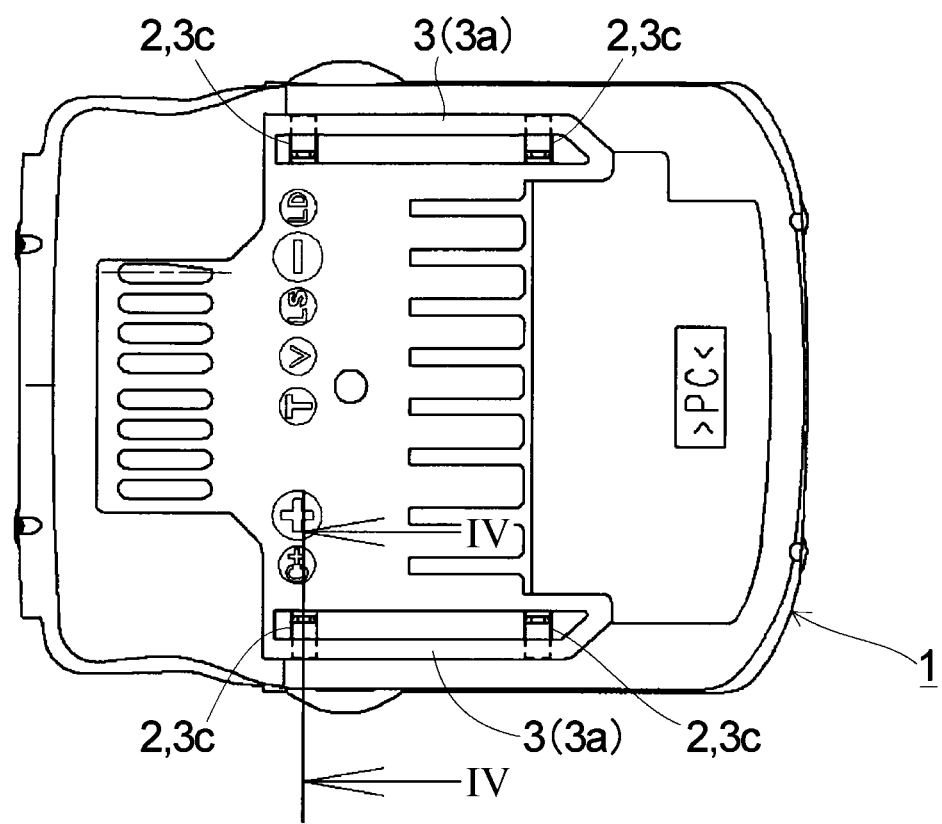
FIG. 3 is a plan view of the battery pack 1 shown in FIG. 1.
Figure 4:
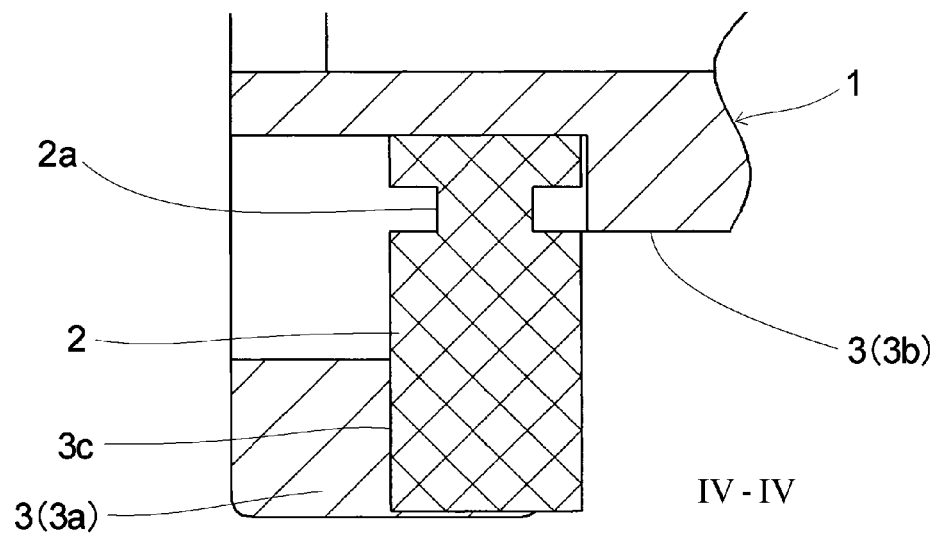
FIG. 4 is an enlarged sectional view taken along a line IV-IV of FIG. 3.
Figure 5A:
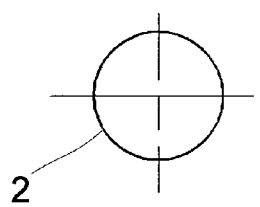
Figure 5B:
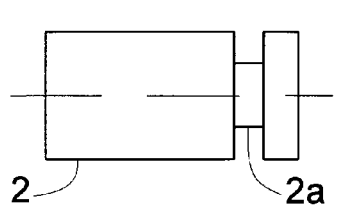
Figure 5C:
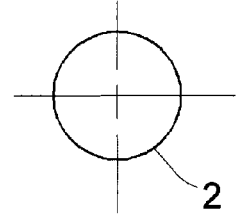

FIG. 1 is a side view of a battery pack 1 that is mounted to an electric tool in a first illustrative embodiment of the invention. FIG. 2 is an enlarged sectional view taken along a line II-II of FIG. 1. FIG. 3 is a plan view of the battery pack 1 shown in FIG. 1. FIG. 4 is an enlarged sectional view taken along a line IV-IV of FIG. 3. FIG. 5 illustrates an outward appearance of an elastic member 2 shown in FIG. 1 and the like, in which FIG. 5A is a left side view, FIG. 5B is a front view and FIG. 5C is a right side view.

The battery pack 1 has therein a secondary battery such as a chargeable lithium battery and the like. The battery pack 1 is configured to feed power to a motor that is a driving source of a cordless electric tool, which is a mounting target. Incidentally, the type of the cordless electric tool is not particularly limited. The battery pack 1 has battery-side guide parts 3, which are configured to guide the mounting of the battery pack to the electric tool, at upper parts of both sides thereof.

The battery-side guide part 3 has a battery-side rail part 3a and an engaging recess portion 3b. Elastic members 2 (for example, rubber) functioning as a pressing member are mounted to the battery-side rail part 3a. Specifically, a side of the battery-side rail part 3a facing the engaging recess portion 3b is provided with insertion parts 3c at two positions in a front-rear direction, and the elastic members 2 are held in the respective insertion parts 3c. A part of an outer periphery of the elastic member 2 partially protrudes from a wall surface of the battery-side rail part 3a of the battery pack 1 towards the lower (towards the engaging recess portion 3b). As shown in FIG. 5, the elastic member 2 has a substantial cylinder shape. The elastic member 2 is formed with a constricted part 2a at a predetermined position of the outer periphery thereof. The constricted part 2a makes a round of the outer periphery of the elastic member 2. As shown in FIG. 2, the insertion part 3c is formed with two pulling-out prevention convex portions 3d that are opposed to each other. The constricted part 2a of the elastic member 2 is engaged with the pulling-out prevention convex portions 3d, so that the elastic member 2 is prevented from being pulled out from the insertion part 3c. A surface of the pulling-out prevention convex portion 3d facing an opening of the insertion part 3c (facing the lower in FIG. 2) is inwardly inclined. Thereby, when the elastic member 2 is inserted into the insertion part 3c, an end portion of the elastic member 2 facing the constricted part 2a is elastically deformed along the inclined surface, so that the elastic member can be easily inserted. Incidentally, this is also the same for a configuration where an inclined surface is provided at an end portion of the constricted part 2a of the elastic member 2, not the insertion part 3c. The engaging recess portion 3b is provided with a latch claw part 4. The latch claw part 4 engages the battery pack 1 and the electric tool at a state where they are mounted (a state of FIG. 6C, which will be described later). The latch claw part 4 can be pushed in by pressing a latch operation part 4a when detaching the battery pack 1 from the electric tool.

Figure 6A:
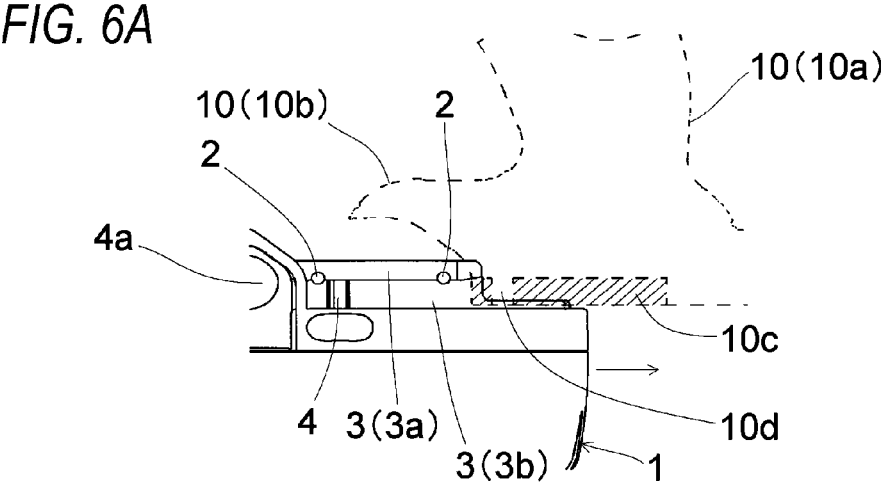
FIGS. 6A to 6C illustrates a process of mounting the battery pack 1 show in FIG. 1 to the electric tool.
Figure 6B:
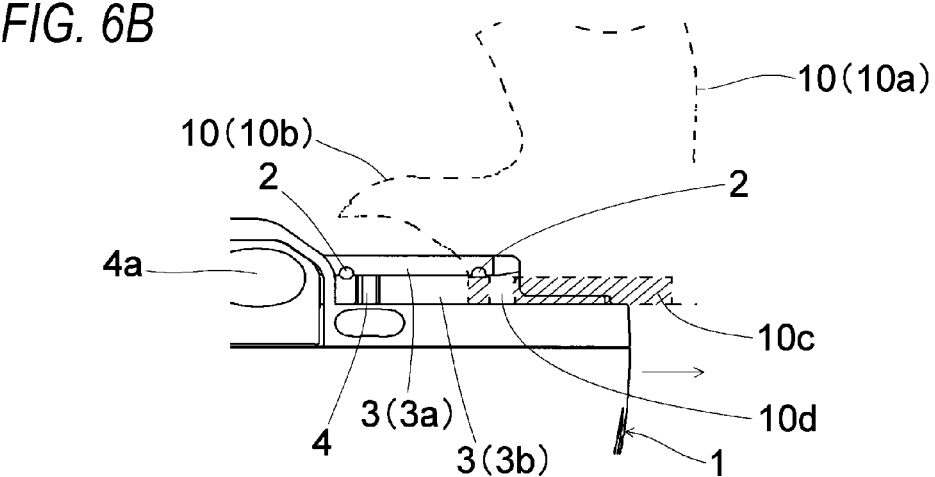
Figure 6C:
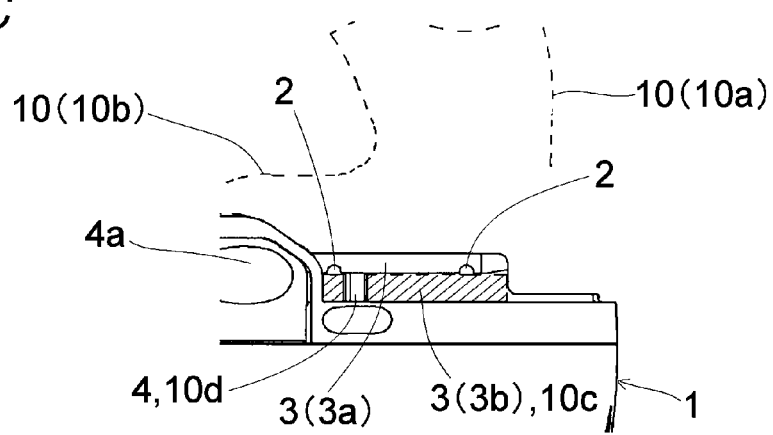

FIGS. 6A to 6C illustrate a process of mounting the battery pack 1 shown in FIG. 1 to the electric tool. A housing 10 of the electric tool has a battery attachment part 10b at a lower end portion of a handle part 10a. The battery attachment part 10b has tool-side rail parts 10c. The tool-side rail parts 10c are mounted on both inner surfaces of the battery attachment part 10b. The tool-side rail part 10c is formed with a latch recess portion 10d that can be engaged with the latch claw part 4 of the battery pack 1. When the battery pack 1 is attached to the battery attachment part 10b, the battery pack 1 is slid in a horizontal direction (a direction substantially perpendicular to an upper-lower direction) with respect to the housing 10, e.g., along a long longitudinal direction of the battery-side rail part 3a, such that the tool-side rail parts 10c of the battery attachment part 10b are introduced into the engaging recess portions 3b of the battery pack 1. Thereby, as shown in FIGS. 6B and 6C, the elastic members 2 are fitted and compressed in the battery-side rail parts 3a and the tool-side rail parts 10c, thereby pressing (pressurizing) the battery-side rail parts 3a and the tool-side rail parts 10c in a direction getting away from each other. Specifically, at a state of FIG. 6C, the elastic members 2 press upwards the battery-side rail parts 3a and press downwards the tool-side rail parts 10c. That is, the elastic members 2 press upwards the battery pack 1 and press downwards the housing 10. In other words, the elastic members 2 press the battery pack 1 and the housing 10 such that they come close to each other. Also, when the battery pack 1 is slid from the state of FIG. 6B to the state of FIG. 6C, the elastic members 2 can rotate in the insertion parts 3c, because the elastic member has the substantial cylinder shape. As a result, it is possible to easily slide the battery pack 1 even though the elastic members 2 press the battery pack.

According to this illustrative embodiment, following advantages can be obtained.

(1) The elastic members 2 press the battery pack 1 and the housing 10 such that they come close to each other. Therefore, it is possible to suppress the rattling of the battery pack 1 and the housing 10 and to minimize a gap between the battery pack 1 and the housing 10, thereby implementing the dust resistance and the gorgeous outward appearance. That is, it is possible to suppress the foreign matters such as dusts from being introduced from the gap between the battery pack 1 and the housing 10 into a terminal part.

(2) The constricted part 2a of the elastic member 2 is engaged with the pulling-out prevention convex portions 3d of the insertion part 3c. Therefore, the elastic member 2 can be prevented from being pulled out and the reliability is thus improved.

(3) When sliding the battery pack 1 to the battery attachment part 10b of the housing 10, the cylindrical elastic members 2 rotate. Thereby, it is possible to easily slide the battery pack 1 even though the elastic members 2 press the battery pack, so that the mounting operability of the battery pack 1 is improved.

<Second Illustrative Embodiment>

Figure 7:
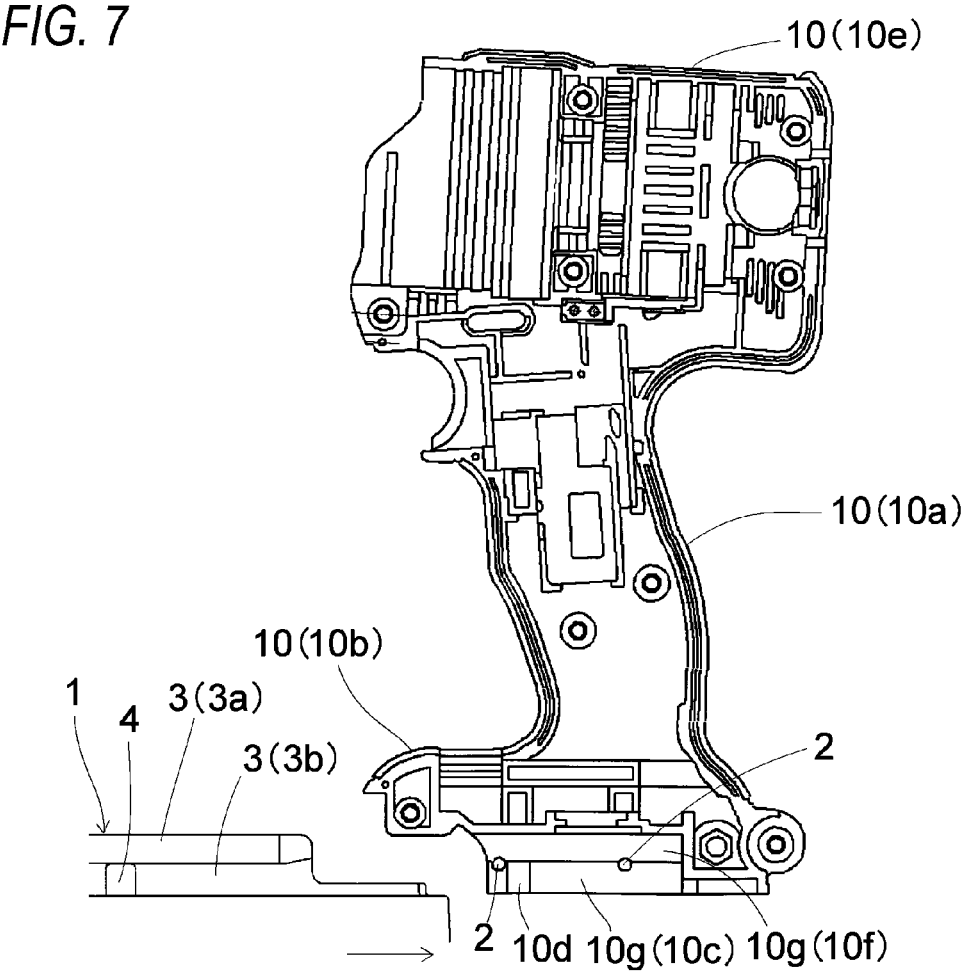
FIG. 7 is a side sectional view of an electric tool according to a second illustrative embodiment of the invention.
Figure 8:
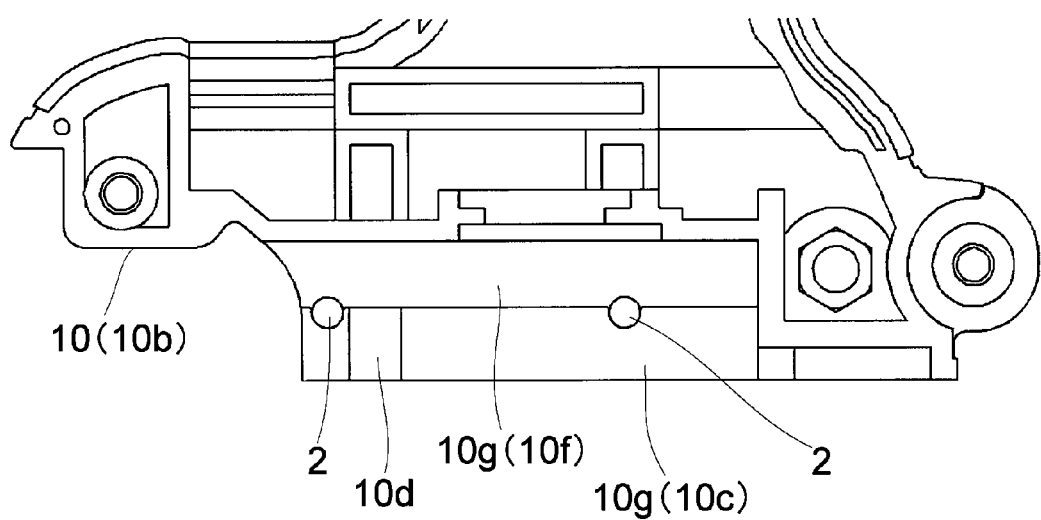
FIG. 8 is an enlarged view of main parts of FIG. 7.

FIG. 7 is a side sectional view of an electric tool according to a second illustrative embodiment of the invention. FIG. 8 is an enlarged view of main parts of FIG. 7. The housing 10 of the electric tool has a cylindrical part 10e in which the motor and the like are mounted, and the handle part 10a extends downwards from a middle part of the cylindrical part 10e. This illustrative embodiment is the same as the first illustrative embodiment, except that the elastic members 2 are mounted at tool-side guide parts 10g. The tool-side guide parts 10g are provided on both inner surfaces of the battery attachment part 10b. The tool-side guide part 10g has a tool-side rail part 10c and an engaging recess portion 10f. The elastic members 2 functioning as a pressing member are mounted to the tool-side rail part 10c. The elastic member 2 partially protrudes upwards (towards the engaging recess portion 10f) from a wall surface of the tool-side rail part 10c. The holding structure of the elastic member 2 by the tool-side rail part 10c is the same as that of the elastic member 2 by the battery-side rail part 3a. Also in this illustrative embodiment, the similar effects to the first illustrative embodiment can be obtained.

Although the invention has been described with reference to the illustrative embodiments, one skilled in the art can understand that the respective constitutional elements and respective processing of the illustrative embodiments can be variously modified. In the below, modified embodiments will be described.

When providing the elastic members 2 at the two positions of the battery-side rail parts 3a and the tool-side rail parts 10c in the front-rear direction (the four positions in a left-right direction), it is preferable to provide the same at the positions that are spaced from each other in the long longitudinal direction of the rail part and of which distances from the end portions of the battery-side rail parts 3a and the tool-side rail parts 10c in the front-rear direction are the same. In this case, when attaching the battery pack 1 to the battery attachment part 10b, it is possible to suppress the battery pack 1 from being inclined with respect to the battery attachment part 10b (the tool-side guide part 10g), and thus it is possible to suppress the gap between the battery pack 1 and the housing 10 from being increased. Further, the elastic member 2 may be provided only at one position in the front-rear direction (two positions in the left-right direction). In this case, the elastic member 2 is preferably provided at the latch claw part 4-side. When mounting the battery pack 1 to the battery attachment part 10b, the battery pack is pressed only at a state where the battery pack is somewhat mounted. Hence, it is possible to suppress a sliding-moving resistance. Specifically, this configuration is effective in a configuration where the elastic member 2 is difficult to rotate in the insertion part 3c having a prismatic column shape and the like. Further, the three or more elastic members 2 may be provided and may be arranged at an equal interval on the battery-side rail part 3a and the tool-side rail part 10c. In this case, when the elastic member 2 has a shape that it can easily rotate, it is possible to further improve the dust resistance and the rattling suppressing effect. The pressing member may be other members such as a plate spring. Further, the elastic member 2 is not necessarily provided on the rail part and may be provided at any position at which it is possible to press the battery pack 1 and the housing 10 in the direction along which they come close to each other.

The following matters may also be disclosed in this specification.

(1) An electric tool comprising: a housing having a battery attachment part; and a battery pack, wherein a rail part, which is configured to guide mounting of the battery pack to the battery attachment part, is provided with a pressing member that is configured to press the battery pack and the housing such that they come close to each other.

(2) The electric tool according to (1), wherein the pressing member is provided to a rail part of the battery pack.

(3) The electric tool according to (2), wherein the pressing member partially protrudes from the rail part towards a side opposite to the housing.

(4) The electric tool according to (1), wherein the pressing member is provided to a rail part of the battery attachment part.

(5) The electric tool according to (4), wherein the pressing member partially protrudes from the rail part towards a side opposite to the battery pack.

(6) The electric tool according to any one of (1) to (5), wherein the pressing member is an elastic member.

(7) The electric tool according to claim (6), wherein the elastic member has a substantial cylinder shape and is configured to press the battery pack and the housing with an outer periphery thereof.

(8) The electric tool according to (6) or (7), wherein the rail part is provided with an insertion part for inserting the elastic member therein, and wherein the elastic member is prevented from being pulled out from the insertion part.

(9) The electric tool according to (8), wherein the insertion part is provided with a pulling-out prevention convex portion, and wherein the elastic member is provided with a constricted part configured to engage with the pulling-out prevention convex portion when the elastic member is inserted into the insertion part.

(10) The electric tool according to any one of (1) to (9), wherein a pressing direction of the pressing member is substantially perpendicular to a long longitudinal direction of the rail part.

(11) The electric tool according to any one of (1) to (10), wherein the pressing member is provided in plural in a long longitudinal direction of the rail part.

(12) The electric tool according to any one of (1) to (11), further comprising: a latch part configured to engage the battery pack and the battery attachment part at a state where they are mounted, wherein the pressing member is provided to at least the latch part-side.

(13) An electric tool comprising: a housing having a battery attachment part; and a battery pack that is coupled to a lower side of the battery attachment part, wherein the battery pack is configured to come close to an upper side when the battery pack is mounted to the battery attachment part along a rail part.

(14) The electric tool according to (13), wherein the rail part is provided with a pressing member configured to press the battery pack and the housing such that they come close to each other.

(15) An electric tool comprising: a housing having a battery attachment part, to which a battery pack is configured to be mounted thereto, wherein the battery pack is configured to come close to the housing when the battery pack is mounted to the battery attachment part along a rail part.

(16) The electric tool according to (15), wherein the battery pack is configured to be slid along the rail part and to come close to the housing in a direction intersecting the rail part.

(17) A battery pack configured to be mounted to an electric tool having a battery attachment part, the battery pack comprising: a battery-side rail part configured to be guided along a tool-side rail part of the battery attachment part, wherein the battery-side rail part is provided with a pressing member configured to press the battery pack and the electric tool such that they come close to each other.

What is claimed is:

1. An electric tool comprising:
   a housing having a battery attachment part;
   a battery pack,
      wherein one of the battery attachment part and the battery pack includes a rail part fixed thereto, and another one of the battery pack and the battery attachment part engages the rail part such that the battery pack slides along a rail as it is attached to or detached from the housing, and
      wherein the rail part is provided with a pressing member that is configured to press in a direction intersecting a slide direction of the battery pack as it is attached to or detached from the housing such that the battery pack and the housing come close to each other; and
   a latching part disposed in one of the battery attachment part and the battery pack and configured to engage a recess portion in the other of the battery attachment part and the battery pack independent from the pressing member.

2. The electric tool according to claim 1, wherein the rail part is a battery-side rail part provided to the battery pack, and wherein the pressing member is provided to the rail part.

3. The electric tool according to claim 2, wherein the pressing member partially protrudes from the rail part towards a side opposite to the housing.

4. The electric tool according to claim 1, wherein the rail part is a tool-side rail part provided to the battery attachment part, and wherein the pressing member is provided to the rail part.

5. The electric tool according to claim 4, wherein the pressing member partially protrudes from the rail part towards a side opposite to the battery pack.

6. The electric tool according to claim 1, wherein the pressing member is an elastic member.

7. The electric tool according to claim 6, wherein the elastic member has a substantial cylinder shape and is configured to press the battery pack and the housing with an outer periphery thereof.

8. The electric tool according to claim 6, wherein the rail part is provided with an insertion part for inserting the elastic member therein, and wherein the elastic member is prevented from being pulled out from the insertion part.

9. The electric tool according to claim 8, wherein the insertion part is provided with a pulling-out prevention convex portion, and wherein the elastic member is provided with a constricted part configured to engage with the pulling-out prevention convex portion when the elastic member is inserted into the insertion part.

10. The electric tool according to claim 1, wherein a pressing direction of the pressing member is substantially perpendicular to a long longitudinal direction of the rail part.

11. The electric tool according to claim 1, wherein the pressing member is provided in plural in a long longitudinal direction of the rail part.

12. The electric tool according to claim 1, further comprising: a latch part configured to engage the battery pack and the battery attachment part at a state where they are mounted, wherein the pressing member is provided to at least the latch part-side.

13. An electric tool comprising:
a housing having a battery attachment part;
a battery pack that is coupled to a lower side of the battery attachment part,
   wherein one of the battery attachment part and the battery pack includes a pressing member that is configured to press in a direction intersecting a slide direction of the battery pack as it is attached to or detached from the housing, and
   wherein the battery pack is configured to come close to an upper side when the battery pack is mounted to the battery attachment part along a rail part
a latching part disposed in one of the battery attachment part and the battery pack and configured to engage a recess portion in the other of the battery attachment part and the battery pack independent from the pressing member.

14. The electric tool according to claim 13, wherein the rail part is provided with a pressing member configured to press the battery pack and the housing such that they come close to each other.

15. An electric tool comprising:
a housing having a battery attachment part, to which a battery pack is configured to be mounted thereto,
   wherein the battery attachment part includes a rail part fixed thereto along which the battery pack and the battery attachment part engages such that the battery pack slides along the battery attachment part in a longitudinal direction of the battery pack as it is attached to or detached from the housing, and
   wherein the battery pack is configured to come close to the housing in a direction intersecting a slide direction of the battery pack when the battery pack is attached to the battery attachment part along the rail part; and
a latching part disposed in one of the battery attachment part and the battery pack and configured to engage a recess portion in the other of the battery attachment part and the battery pack.

16. The electric tool according to claim 15, wherein the battery pack is configured to be slid along the rail part and to come close to the housing in a direction intersecting the rail part.

17. A battery pack configured to be mounted to an electric tool having a battery attachment part, the battery pack comprising:
a battery-side rail part configured to be guided in a slide direction of the battery pack when engaged with a tool-side rail part of the battery attachment part,
   wherein the battery-side rail part is provided with a pressing member configured to press in a direction intersecting the slide direction of the battery pack such that the battery pack and the electric tool come close to each other when engaged; and
a latching part disposed in one of the battery-side rail part and the tool-side rail part and configured to engage a recess portion in the other of the battery-side rail part and the tool-side rail part independent from the pressing member.

* * * * *